United States Patent
Muller et al.

(10) Patent No.: US 6,542,628 B1
(45) Date of Patent: Apr. 1, 2003

(54) METHOD FOR DETECTION OF ELEMENTS OF INTEREST IN A DIGITAL RADIOGRAPHIC IMAGE

(75) Inventors: Serge Muller, Guyancourt (FR); Andreas Rick, Plaisir (FR)

(73) Assignee: GE Medical Systems, S.A., Buc (FR)

( * ) Notice: Subject to any disclaimer, the term of this patent is extended or adjusted under 35 U.S.C. 154(b) by 0 days.

(21) Appl. No.: 09/517,349

(22) Filed: Mar. 2, 2000

(30) Foreign Application Priority Data

Mar. 12, 1999 (FR) .................................... 99 03082

(51) Int. Cl.⁷ ................................................ G06K 9/00
(52) U.S. Cl. ........................................ 382/132; 250/587
(58) Field of Search ............................. 382/131, 260, 382/270, 115, 128, 100, 132, 261, 256, 266; 162/109; 348/66; 250/587

(56) References Cited

U.S. PATENT DOCUMENTS

| | | | | |
|---|---|---|---|---|
| 4,947,323 A | * | 8/1990 | Smith .................... | 364/413.13 |
| 5,515,450 A | * | 5/1996 | Takeo et al. ............ | 382/132 |
| 5,627,907 A | * | 5/1997 | Gur et al. ............... | 382/132 |
| 5,633,511 A | * | 5/1997 | Lee et al. ............... | 250/587 |
| 6,137,898 A | * | 10/2000 | Broussard et al. ....... | 382/132 |

FOREIGN PATENT DOCUMENTS

| | | |
|---|---|---|
| JP | 4-86820 | 3/1992 |
| JP | 11508815 | 9/1997 |
| JP | 11501538 | 2/1999 |
| JP | 11-56828 | 3/1999 |

* cited by examiner

*Primary Examiner*—Jayanti K. Patel
*Assistant Examiner*—Seyed Azarian
(74) *Attorney, Agent, or Firm*—Jay L. Chaskin

(57) ABSTRACT

Method of improved detection of elements of interest by means of a detection system in a digital radiographic image of an object, acquired on an acquisition chain, comprising a first calibration phase in which the performances of the detection system are established. For such purpose, a calibration curve with several dimensions is determined by means of a mathematical model of the acquisition chain and object, in order to express a false positive probability as a function of a set of parameters corresponding to the acquisition chain and object. In the course of a second phase of use, a false positive probability value is determined for each pixel of the image. One then selects among the pixels of the digital radiographic image acquired those whose probability value obtained satisfies a predetermined criterion.

42 Claims, 3 Drawing Sheets

METHOD FOR DETECTION OF ELEMENTS OF INTEREST IN A DIGITAL RADIOGRAPHIC IMAGE

BACKGROUND OF THE INVENTION

The invention concerns the automatic detection of small-sized elements of interest mingled with noise in a digital radiographic image.

It has a particularly interesting application in the medical field, in which analysis of the fixation of calcium salts in the tissues of the organism is undertaken. These microcalcifications are of small size, and it is often difficult to distinguish them from the noise in an image, where microcalcifications and noise are represented at the same time in the form of small spots.

The effective treatment of a breast cancer necessitates a medical follow-up from the first signs of cancer. These signs are present in the form of calcium salts fixed on the tissues of the mammary gland. They are generally detected on an X-ray of the mammary gland, in the course of which they appear on an image in the form of minuscule bright spots (light spots).

Their small dimensions render their detection difficult and they are sometimes missed.

Entirely digitized mammography acquisition chains are known, intended for the detection of microcalcifications. Said detection necessitates the development of image processing algorithms in order to differentiate the light spots due to said microcalcifications from those due to noise.

In general, in the prior art, the detection of microcalcifications is carried out from a film that is digitized. Filtering can then be carried out, followed by application of a threshold on the image.

One can cite the method of estimation of noise level from the image itself, developed by Nico Karssemeijer, "Adaptative Noise Equalization and Recognition of Microcalcification Clusters in Mammograms," in "State of the Art in Digital Mammographic Image Analysis," published by K. W. Bowyer, S. Astley, *World Scientific*, 1994. But this method leads to an ambiguity of distinction between the elements representing noise and the elements representing microcalcifications, for it is based on scanned film images and does not take the acquisition parameters into account.

Another method was presented by Michael Brady, Ralph Highman and Brasil Shepstone, "A representation for mammographic image processing," *Medical Image Analysis*, Vol. 1, No. 1, 1996, pp. 1–18, in which a process of image generation on X-ray film is modeled. But this process does not include a noise model.

In all the systems of the prior art, the selection of a threshold is often difficult, since the noise is dependent on the image content. The size of the microcalcifications not being limited by a minimum value, their detection results from a compromise between the detection of many noises as microcalcifications and a neglect of small-sized microcalcifications.

BRIEF SUMMARY OF THE INVENTION

The invention is directed to a solution to the problem of determination of the threshold in order to extract the microcalcifications from the noise.

In an embodiment of the invention an estimate is made of the probability for a pixel or an elementary zone to be a false negative, that is, the probability for a pixel representing a theoretical microcalcification not to be detected, in order to afford the user the choice of an acceptable number of false negatives.

In an embodiment of the invention a method of improved detection of elements of interest by means of a detection system in a digital radiographic image of an object, acquired on an acquisition chain.

According to a general characteristic of the invention, the method comprises two phases. The first is a calibration phase, in which one determines from a mathematical model of the acquisition chain and object a plurality of images corresponding to a plurality of gray input levels representing a set of parameters of the object and a set of parameters of the acquisition chain variable over a range of predetermined values. One then elaborates, from the system of detection and plurality of images, a mathematical model of detection giving a theoretical number of elements detected as a function of a set of parameters of the acquisition chain, a useful output signal of the detection system and a gray background level of the image considered, representing one of the sets of parameters of the object.

Each gray level presented on input of the mathematical model of the acquisition chain and of the object advantageously represents a set of parameters of the object, such as the thickness and composition of a breast on a mammogram.

The mathematical model of detection thus established represents the performances of the detection system relative to a set of parameters variable over a range of given values. In other words, the theoretical response of the detection system is determined as a function of all the configurations realizable in the course of an X-ray. The first phase is preferably carried out only once for any detection system.

The second phase is carried out for each acquisition of a digital radiographic image. It is a phase of use in which the detection system is applied on the digital radiographic image. Then, for each elementary zone of that image, one introduces as input data in the mathematical model of detection the useful output signal of the detection system, a set of parameters of the acquisition chain taken among the predetermined values and used to obtain said digital radiographic image, and a gray background level calculated on said digital radiographic image, so as to determine a theoretical number of elements detected. One then selects among the elementary zones of the digital radiographic image acquired those whose theoretical number of detected elements satisfies a predetermined criterion.

BRIEF DESCRIPTION OF THE DRAWINGS

Other advantages and characteristics of the invention will appear on examination of the detailed description of a nonlimitative embodiment and of the attached drawings, in which.

DETAILED DESCRIPTION OF THE INVENTION

Figure 1:
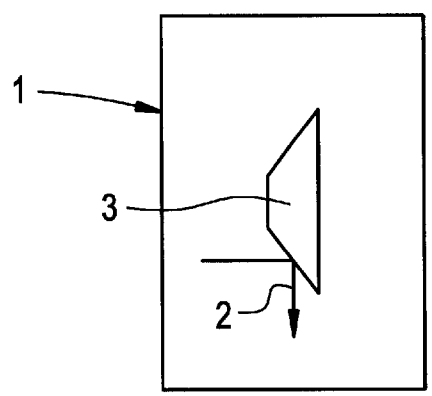
FIG. 1 is a schematic view of the elements of the acquisition chain and of the object according to the invention.
Figure 1:
Figure 1:
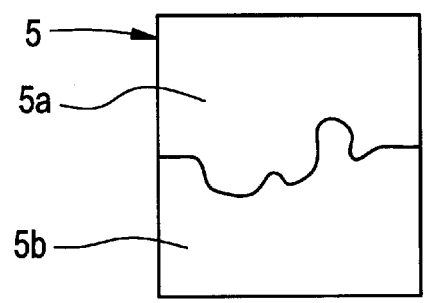
Figure 1:
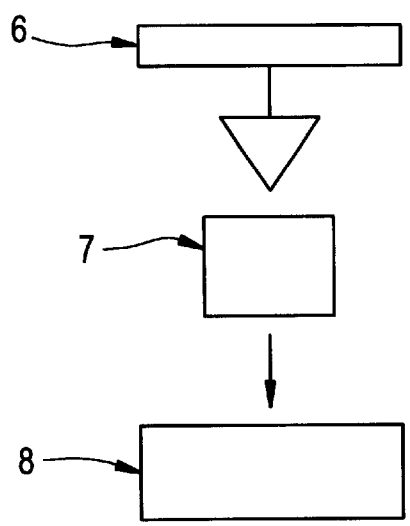

All of the parameters necessary for obtaining a theoretical number of elements detected for each elementary zone of the digital radiographic image is re-entered in the mathematical model of detection. These parameters can be separated into three groups, namely, the parameters of the acquisition chain, the output signal of the detector and the parameters calculated from the digital radiographic image, such as the gray background level. It is also possible to introduce in the parameters of the third group, in addition to the gray background level, other characteristics of the object or of the acquisition chain measurable on the image, like, for example, the amplitude of the periodic linear artifacts introduced in the image by an antidiffusion grid.

The mathematical model of the acquisition chain and of the object advantageously includes a noise model.

According to one embodiment of the invention, the detection system, adapted to each of the sets of parameters of the elements of interest, is applied several times on the same image, so as to scan a given range of values of the parameters of said elements of interest.

For example, when the elements of interest are microcalcifications, their size and shape are preferably taken as parameters of those elements of interest.

In a preferred embodiment, the detection system, adapted to each of the sets of parameters of the elements of interest, is applied several times on the acquired digital radiographic image, so as to obtain several theoretical numbers of elements detected for each elementary zone of the digital radiographic image, and one selects among the elementary zones the ones whose smallest theoretical number of detected element s obtained satisfies the predetermined criterion.

In general, taking the smallest of the theoretical numbers is equivalent to applying a detection system best suited to the size and shape of the microcalcifications.

The detection system can advantageously be a top-hat type filter.

The top-hat transformation is a mathematical treatment involving two stages:

1. Opening of the image with a structuring element;
2. Subtraction of the image opened on the original image.

A structuring element is a mask which, applied on an image, makes it possible to delimit a zone of pixels. When a structuring element is applied on an image, that is, when the mask is placed on each of the elementary zones of the image, all of the structures smaller than the structuring element are eliminated. A given opening corresponds to a structuring element of a given size. In other words, the result of the first stage is a smoothing of the gray levels. The gray background level is thus obtained. The second stage is an operation of subtraction of the gray background levels on the initial image. A high-frequency signal presenting peaks is thus obtained. This type of filtering is known to the expert and the latter may refer, for more details, to the article by J. Ferra, Image Analysis and Mathematical Morphology, Vol.2, Academic Press, 1988. In general, this type of filtering makes it possible to extract light and small-sized zones from a digital image and to clear the background.

On the high-frequency signal thus obtained, a threshold can then be applied, so as to post a theoretical number of elements of interest detected. Several thresholds are advantageously applied in order to cover a given range of threshold values. In an all-or-nothing configuration, when a threshold is applied, for every element detected, the output of the system realizing the threshold presents a signal level identical to the threshold level applied, and for no element detected that output presents a zero level.

According to one embodiment, the gray background level is calculated by means of a low-pass filtering.

According to a variant of the invention, the background level is calculated by means of a morphological opening.

The theoretical number of elements detected can be advantageously expressed in terms of false positive probability, that is, the probability for an element to be detected when no element of interest has been introduced in the mathematical model of the acquisition chain and of the object.

According to another embodiment of the invention, the theoretical number of elements detected is expressed in terms of false negative probability, that is, the probability for an element of interest introduced in the mathematical model of the acquisition chain and of the object not to be detected. This embodiment necessitates modifying the model of the object by introducing theoretical elements of interest there.

Furthermore, satisfying the predetermined criterion involves fixing a predetermined overall threshold of probability and selecting elementary zones whose sum of probability values remains below or equal to that threshold. In other words, the predetermined criterion can advantageously be a percentage X photon, for example. Satisfying that criterion boils down to preserving the elementary zones whose sum of probability values remains below or equal to X. The summation begins with the lowest probability values.

Satisfying the predetermined criterion can also involve fixing a predetermined overall threshold of probability and selecting each elementary zone whose probability value remains below or equal to that threshold. In this case, no summation is made, but all of the probability values below or equal to X are selected.

According to an advantageous variant of the invention, the theoretical number of elements detected is expressed in terms of false negative and false positive probability. Satisfying the predetermined criterion involves fixing a predetermined overall threshold of probability and selecting each elementary zone, of which a given linear combination of two false negative and false positive probability values remains below or equal to this threshold.

Although the invention is not limited thereto, application of the method according to the invention is going to be described for the detection of microcalcifications by means of a top-hat transformation.

The mathematical model of the acquisition chain and of the object is now going to be described. The acquisition chain is an image acquisition chain containing a set of elements laid out along the same axis. Referring to FIG. 1, the acquisition chain comprises an X-ray tube 1 capable of emitting a beam of X-rays 2. Placed on the path of the beam of X-rays 2 are a filter 4, an object 5 having to be studied, such as a breast, and a detector 6 connected to a digital image processing system 8, such as a properly equipped computer, by means of an analog-digital signal converter 7. This group of elements is fixed on a column (not represented) making it possible to set the distance between the tube 1 and the detector 6.

The tube 1 contains an anode 3 from which the X-rays 2 are emitted and a window through which the X-rays 2 leave the tube. The filter 4 makes possible a bandpass frequency filtering of the X-rays 2.

It is assumed that the breast to be X-rayed is composed of a fibrous tissue 5a (tissue a) and of a fatty tissue 5b (tissue b). The X-rays emitted by the tube 1 are collected by the detector 6 equipped with a scintillator converting the X-rays 2 into visible photons and with a matrix of photodiodes in order to obtain an electric signal. The electric signal thus obtained is then transformed by the converter 7 into a digital signal to be processed by the digital processing system 8.

The X-rays 2 coming out of the tube possess an energy E. The energy is successively attenuated by the elements crossed by the X-rays 2. These elements, the window of the tube 1, the filter 4, the fibrous tissue 5a of the breast 5 and the fatty tissue 5b of the breast 5 respectively possess an attenuation coefficient noted $\mu_{window}$, $\mu_{filter}$, $\mu_{tissue\ a}$ and $\mu_{tissue\ b}$. These elements constitute a set called transmission part. When the X-rays 2 cross one of these elements, they undergo an energy loss defined by:

$$t_{window}(E)=\exp(-\mu_{window}(E)\cdot 1_{window})$$

$$t_{filter}(E)=\exp(-\mu_{filter}(E)\cdot 1_{filter})$$

$$t_{tissue}(E,1_{tissue})=\exp(-\mu_{tissue}(E)\cdot 1_{tissue}(x,y))$$

$\mu_{tissue}$ is a linear combination of $\mu_{tissue\ a}$ and $\mu_{tissue\ b}$.

$t_i(E)$ is therefore a corrective term taking into account the attenuation undergone by the X-rays 2 across the element i of the transmission set, $1_i$ being the distance covered by the X-rays 2 in each element i. $1_{tissue}$ is the sum of the thicknesses of the fatty and fibrous tissue for a point of coordinates (x,y) projected on the detector.

The energy level of the X-rays arriving on the detector 6 is therefore diminished by a quantity of energy according to the corrective terms $t_i(E)$ represented above and it is expressed in terms of number of X photons, noted n. The number n is therefore the number of X photons arriving on the detector 6 as a function of the number $n_0$ of X photons emitted by the tube 1. Those numbers are functions of the energy E and of the locus of coordinates (x,y) on which the X photons arrive on the scintillator. Consequently, they are noted n(x,y,E) and $n_0$(x,y,E). The number n(x,y,E) results from the local attenuation undergone by the $n_0$(x,y,E) X-rays on their crossing between the tube 1 and the detector 6 and depends on the terms $t_i(E)$ of each element i crossed.

The conversion of the X photons into visible photons is made in the scintillator. The conversion of these visible photons into electric charges is made in the photodiodes. Then, the conversion of the charges into gray level of a pixel is made in the analog-digital converter 7.

A model is used of the detector 6 having a conversion factor n(E) between the X-rays of energy E received and represented by n(x,y,E) and a gray level I(x,y) of a pixel of coordinates (x,y) on the detector 6. This is translated by the following equation:

$$I(x,y) = \int_0^{E_{max}} (n_o(x,y,E)\cdot n(E)\cdot t_{window}(E)\cdot t_{filter}(E)\cdot t_{tissue}(E,1_{tissue}))dE$$

The digital resolution of that equation enables us to determine the value of thickness $l_{tissue}$.

The number of X photons arriving on the detector 6 is then calculated:

$$n(x,y,E)=n_0(x,y,E)\cdot t_{window}(E)\cdot t_{filter}(E)\cdot t_{tissue}(E,1_{tissue})$$

The total number N(x,y) of X-rays arriving on the detector 6 is then determined by:

$$N(x,y) = \int_0^{E_{max}} (n(x,y,E))dE$$

The model of the acquisition chain and of the object therefore takes into account the acquisition chain and the breast, and it also takes into account the noise due to operation of the acquisition chain. An analysis of the detector 6 makes it possible to reveal two main noise sources, the electronic noise of variance $\sigma_e^2$, due to the detector 6, and the quantum noise of the X-rays 2 of variance $\sigma_q^2$.

$\sigma_e$ is a value that is measured on the detector. The variance of several images supplied by the detector can, for example, be calculated when the tube 1 is not emitting any radiation.

The distribution of the noise signal induced by the n X photons arriving on the detector 6 generally follows a Poisson distribution, but it is evaluated here at a Gauss distribution of variance equal to n. Therefore, $\sigma_q^2=N(x,y)$.

One then obtains:

$$\sigma_q=\nu N(x,y).$$

The noise is thus modeled by its variance $\sigma_2$:

$$\sigma^2=\sigma_q^2+\sigma_e^2$$

Figure 2:
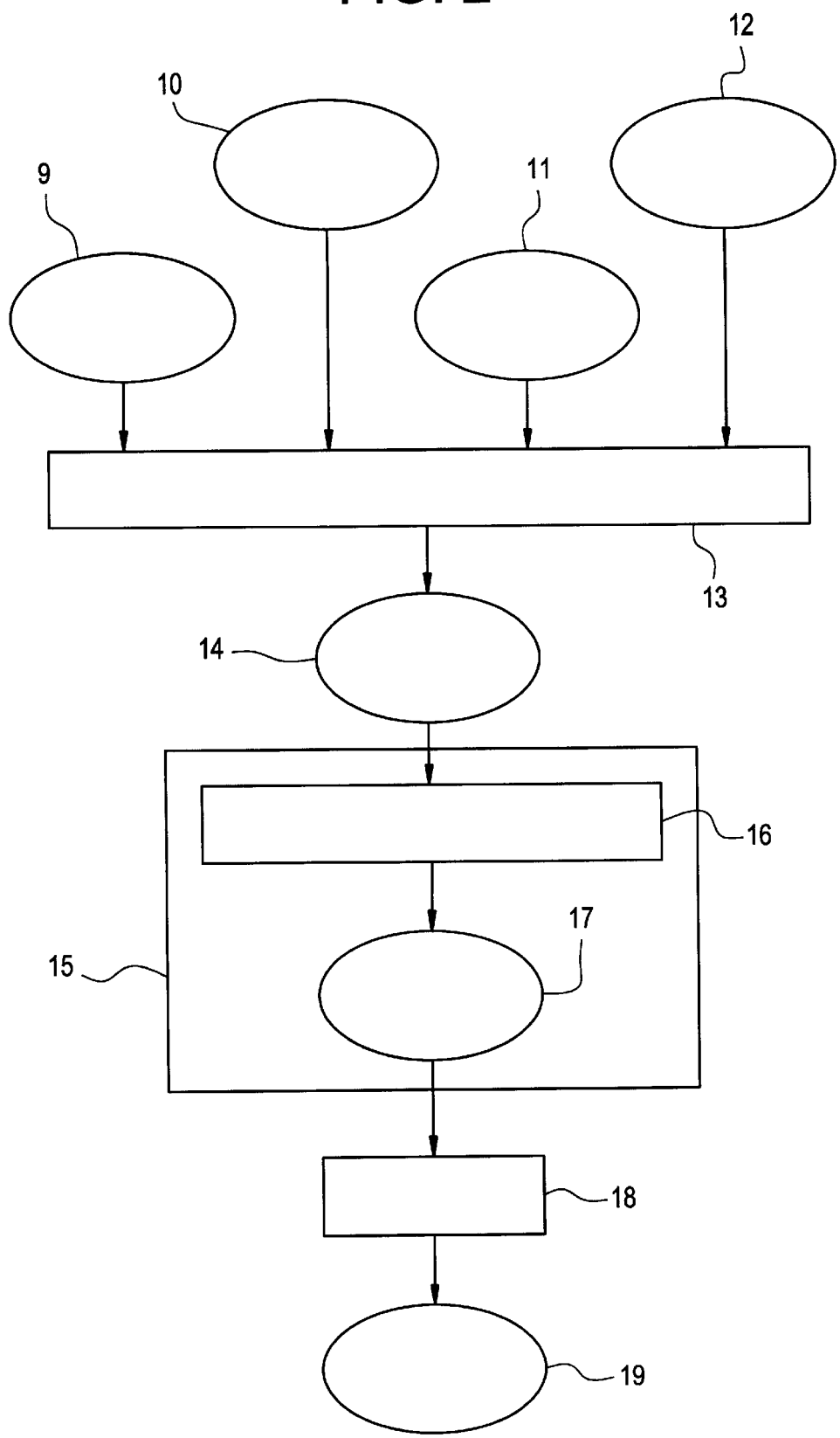
FIG. 2 is a diagram showing the stages of the phase of calibration of the acquisition chain.

The calibration phase is illustrated, in particular, by FIG. 2. A model of the acquisition chain and of the object 13 is distinguished there, having as input variables a succession of gray levels 10 corresponding to different thicknesses and different compositions of the object generally expressed in terms of absorption coefficient, and the set of parameters of the acquisition chain, and which are variable over a range of given values:

acquisition parameters 9: supply voltage of the tube, intensity of the supply current of the tube, exposure time, material of the anode, exit angle of the X-ray beam 2, parameter of the positioner 11: distance between the tube 1 and the detector 7, parameters of the detector 12: type of scintillator, type of photodiode.

The model of the acquisition chain and of the object 13 generates several images on its output. Each output image can be represented by a useful signal 14. Said useful signal consists of a gray background signal corresponding to one of the gray input levels and of a noise signal. A top-hat transformation 15 is then applied, in which an opening 16 makes it possible to obtain the noise signal 17 on which several thresholds 18 are successively applied. For each threshold applied, the false positive probability is determined by counting the number of peaks exceeding said threshold. This operation is carried out for the different gray levels at input of the model of the acquisition chain and of the object so as to plot a calibration curve 19 representing the mathematical model of the top-hat transformation under different conditions established by the set of parameters. This curve is in D dimensions, D being the total number of parameters considered.

Figure 3:
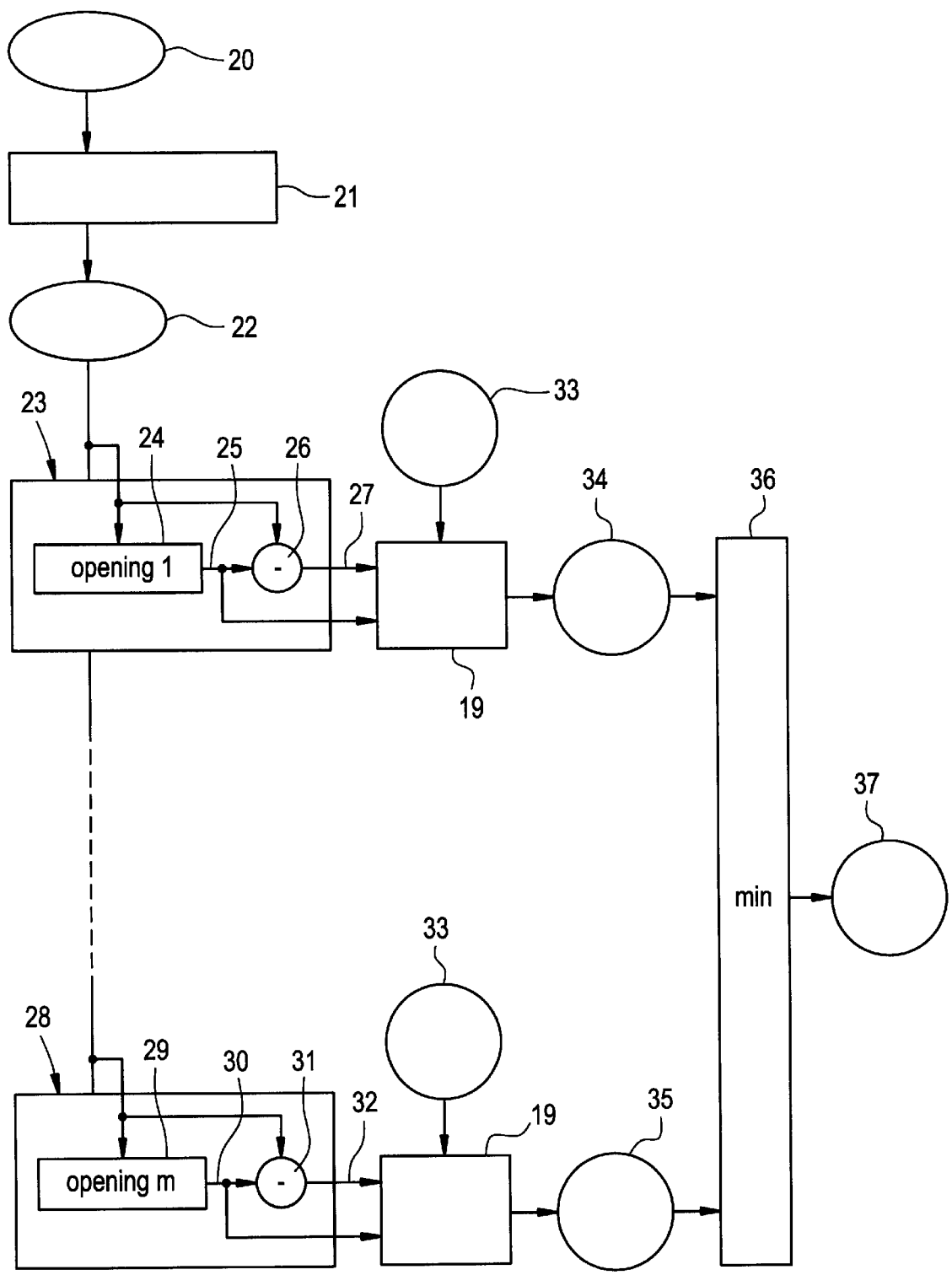
FIG. 3 is a diagram showing the stages of the phases of use of the image.

The phase of use of microcalcifications is then undertaken in accordance with FIG. 3 on a breast mammogram 20 by means of the acquisition chain 21. Several top-hat transformations 23 and 28 of different openings 24 and 29 are applied on the image 22 obtained from the acquisition chain 21. An opening makes possible a filtering of the signal considered by eliminating all the elements of size less than a given size. Openings 1 and m (m is a positive whole number greater than 1) make it possible to obtain a gray background signal 25 or 30 from the image 22. A subtraction operation 26 or 31 is then carried out between the signal of image 22 and the gray background signal 25 or 30 in order to obtain the useful signal 27 or 32. The useful signal 27 is therefore the signal of image 22 minus the gray background signal 25.

In each case of opening 1 to m, two signals are obtained at that stage, the useful signal 27 or 32 of image 22 and the gray background signal 25 or 30 of image 22. The calibration curve 19 obtained in FIG. 2 is applied. It is desired to obtain for each pixel, from the calibration curve actually representing theoretical values, the false positive (and therefore theoretical) probability, by having at the start of said curve the present acquisition parameters 33 used for acquisition of the digital image and those calculated from the image itself, namely, the gray background level and the useful signal level. The parameters to be taken into account for each pixel are a gray background level, a threshold value and the acquisition parameters:

the value of the gray background signal 25 or 30 corresponding to the pixel considered is taken for gray background level;

the value of the useful signal 27 or 32 corresponding to the pixel considered is taken for threshold level;

the parameters 33 used for acquisition of the digital radiographic image is taken for acquisition parameters. These parameters represent one of the sets of acquisition parameters used in the course of the calibration phase.

These three groups of parameters make it possible to read on the calibration curve 19 the false positive probability relating to the pixel considered. The FPP (false positive probability) tables 34 and 35 relating respectively to openings 24 and 29 of the top-hat transformations 23 and 28 are then obtained. For m openings made, FPP tables of type 34 and 35 represented in FIG. 3 are obtained.

A minimization operation is then carried out in the course of stage 36, taking into account the set of FPP tables. This operation therefore consists of taking, for each pixel, the minimum value of false positive probability among the m values obtained. A single $FPP_{min}$ table 37 is then obtained, in which each pixel is represented by a minimum false positive probability value.

The user can then intervene by indicating a number of pixels he/she wishes to keep as false positives, taking, for example, the number 3. All of the pixels, the sum of whose false positive probability values in the $FPP_{min}$ table 37 is less than or equal to 3, are chosen in that case. The choice is started from the lowest values, for a low false positive probability value signifies that there is little chance the pixel chosen corresponds to noise, that is, a high probability that it corresponds to a microcalcification.

Another criterion can also be established, such as the choice of the set of pixels whose false positive probability value is less than or equal to a given number, 0.05, for example.

Furthermore, mathematical equations make it possible, in case of use of a top-hat transformation, to give the false positive probability as a function of a threshold s, a gray background level g and the variance of noise $\sigma^2$. The false positive probability for the value of a pixel of gray background level equal to g to exceed threshold s, for a noise level of variance $\sigma^2$, is then obtained by executing the following algorithm:

$$PFP_{pixel(x,y)} = \int_{s+g(x,y)}^{\infty} \frac{1}{\sqrt{2\pi}\sigma(x,y)} e^{-\frac{1}{2}\left(\frac{v-g(x,y)^1}{\sigma(x,y)}\right)^2} dv$$

For all of the K pixels of a given structuring element, the false positive probability is given by:

$$FPP(x,y) = 1 - (1 - FPP_{pixel}(x,y))^K$$

The invention makes it possible to determine the microcalcifications automatically by means of a mathematical model of the acquisition chain and of the object, taking into account the conditions of acquisition and including a noise model independent of the radiographic image.

Various modifications in structure and/or steps and/or function may be made by one skilled in the art without departing from the scope of the invention.

What is claimed is:

1. A method of improved detection of elements of interest by means of a detection system in a digital radiographic image of an object, acquired on an acquisition chain, comprising the steps of:

a) a calibration phase, in which:

determining from a mathematical model of the acquisition chain and object a plurality of images corresponding to a plurality of gray input levels representing a set of parameters of the object and a set of parameters of the acquisition chain variable over a predetermined range of values;

elaborating, from the system of detection and plurality of images, a mathematical model of detection giving a theoretical number of elements detected as a function of a set of parameters of the acquisition chain, a useful output signal of the detection system and a gray background level of the image considered, representing one of the sets of parameters of the object;

b) a phase of use in which:

the detection system is applied on the digital radiographic image;

for each elementary zone of that image, one introduces as input data in the mathematical model of detection the useful output signal of the detection system, a set of parameters of the acquisition chain taken among the predetermined values and used to obtain said digital radiographic image, and a gray background level calculated on said digital radiographic image, so as to determine a theoretical number of elements detected;

selecting among the elementary zones of the digital radiographic image acquired those whose theoretical number of detected elements satisfies a predetermined criterion.

2. The method according to claim 1, wherein the mathematical model of the acquisition chain and object includes a noise model.

3. The method according to claim 1, wherein in the course of the calibration phase, the detection system is applied several times on the same image, adapted to each of the sets of parameters of the elements of interest, so as to scan a given range of values of the parameters of the elements of interest.

4. The method according to claim 2, wherein in the course of the calibration phase, the detection system is applied several times on the same image, adapted to each of the sets of parameters of the elements of interest, so as to scan a given range of values of the parameters of the elements of interest.

5. Method according to claim 1, wherein in the course of the phase of use, the detection system is applied several times on the acquired digital radiographic image, adapted to each of the sets of parameters of the elements of interest, so as to obtain several theoretical numbers of elements detected for each elementary zone of said digital radiographic image, and one selects among the elementary zones the ones whose smallest theoretical number of detected elements obtained satisfies said predetermined criterion.

6. Method according to claim 2, wherein in the course of the phase of use, the detection system is applied several times on the acquired digital radiographic image, adapted to each of the sets of parameters of the elements of interest, so as to obtain several theoretical numbers of elements detected for each elementary zone of said digital radiographic image, and one selects among the elementary zones the ones whose smallest theoretical number of detected elements obtained satisfies said predetermined criterion.

7. Method according to claim 3, wherein in the course of the phase of use, the detection system is applied several times on the acquired digital radiographic image, adapted to each of the sets of parameters of the elements of interest, so as to obtain several theoretical numbers of elements detected for each elementary zone of said digital radiographic image, and one selects among the elementary zones the ones whose smallest theoretical number of detected elements obtained satisfies said predetermined criterion.

8. Method according to claim 4, wherein in the course of the phase of use, the detection system is applied several times on the acquired digital radiographic image, adapted to each of the sets of parameters of the elements of interest, so as to obtain several theoretical numbers of elements detected for each elementary zone of said digital radiographic image, and one selects among the elementary zones the ones whose smallest theoretical number of detected elements obtained satisfies said predetermined criterion.

9. Method according to claim 5, wherein in the course of the phase of use, the detection system is applied several times on the acquired digital radiographic image, adapted to each of the sets of parameters of the elements of interest, so as to obtain several theoretical numbers of elements detected for each elementary zone of said digital radiographic image, and one selects among the elementary zones the ones whose smallest theoretical number of detected elements obtained satisfies said predetermined criterion.

10. The method according to claim 1, wherein the detection system is a filter of top-hat type.

11. The method according to claim 1, wherein the gray background level is calculated by means of bandpass filtering.

12. The method according to claim 1, wherein the gray background level is calculated by means of a morphological opening.

13. The method according to claim 1, wherein the theoretical number of elements detected is expressed in terms of false positive probability, that is, the probability for an element to be detected when no element of interest has been introduced in the mathematical model of the acquisition chain and of the object.

14. The method according to claim 2, wherein the theoretical number of elements detected is expressed in terms of false positive probability, that is, the probability for an element to be detected when no element of interest has been introduced in the mathematical model of the acquisition chain and of the object.

15. The method according to claim 3, wherein the theoretical number of elements detected is expressed in terms of false positive probability, that is, the probability for an element to be detected when no element of interest has been introduced in the mathematical model of the acquisition chain and of the object.

16. The method according to claim 4, wherein the theoretical number of elements detected is expressed in terms of false positive probability, that is, the probability for an element to be detected when no element of interest has been introduced in the mathematical model of the acquisition chain and of the object.

17. The method according to claim 5, wherein the theoretical number of elements detected is expressed in terms of false positive probability, that is, the probability for an element to be detected when no element of interest has been introduced in the mathematical model of the acquisition chain and of the object.

18. The method according to claim 6, wherein the theoretical number of elements detected is expressed in terms of false positive probability, that is, the probability for an element to be detected when no element of interest has been introduced in the mathematical model of the acquisition chain and of the object.

19. The method according to claim 7, wherein the theoretical number of elements detected is expressed in terms of false positive probability, that is, the probability for an element to be detected when no element of interest has been introduced in the mathematical model of the acquisition chain and of the object.

20. The method according to claim 8, wherein the theoretical number of elements detected is expressed in terms of false positive probability, that is, the probability for an element to be detected when no element of interest has been introduced in the mathematical model of the acquisition chain and of the object.

21. The method according to claim 9, wherein the theoretical number of elements detected is expressed in terms of false positive probability, that is, the probability for an element to be detected when no element of interest has been introduced in the mathematical model of the acquisition chain and of the object.

22. The method according to claim 10, wherein the theoretical number of elements detected is expressed in terms of false positive probability, that is, the probability for an element to be detected when no element of interest has been introduced in the mathematical model of the acquisition chain and of the object.

23. The method according to claim 11, wherein the theoretical number of elements detected is expressed in terms of false positive probability, that is, the probability for an element to be detected when no element of interest has been introduced in the mathematical model of the acquisition chain and of the object.

24. The method according to claim 12, wherein the theoretical number of elements detected is expressed in terms of false positive probability, that is, the probability for an element to be detected when no element of interest has been introduced in the mathematical model of the acquisition chain and of the object.

25. The method according to claim 1, wherein the theoretical number of elements detected is expressed in terms of false negative probability, that is, the probability for an element of interest introduced in the mathematical model of the acquisition chain and of the object not to be detected.

26. The method according to claim 2, wherein the theoretical number of elements detected is expressed in terms of false negative probability, that is, the probability for an element of interest introduced in the mathematical model of the acquisition chain and of the object not to be detected.

27. The method according to claim 3, wherein the theoretical number of elements detected is expressed in terms of false negative probability, that is, the probability for an element of interest introduced in the mathematical model of the acquisition chain and of the object not to be detected.

28. The method according to claim 5, wherein the theoretical number of elements detected is expressed in terms of false negative probability, that is, the probability for an element of interest introduced in the mathematical model of the acquisition chain and of the object not to be detected.

29. The method according to claim 10, wherein the theoretical number of elements detected is expressed in terms of false negative probability, that is, the probability for an element of interest introduced in the mathematical model of the acquisition chain and of the object not to be detected.

30. The method according to claim 11, wherein the theoretical number of elements detected is expressed in terms of false negative probability, that is, the probability for an element of interest introduced in the mathematical model of the acquisition chain and of the object not to be detected.

31. The method according to claim 12, wherein the theoretical number of elements detected is expressed in terms of false negative probability, that is, the probability for an element of interest introduced in the mathematical model of the acquisition chain and of the object not to be detected.

32. The method according to claim 13, wherein satisfying the predetermined criterion involves fixing a predetermined overall threshold of probability and selecting elementary zones, the sum of whose probability values remains below or equal to that threshold.

33. The method according to claim 25, wherein satisfying the predetermined criterion involves fixing a predetermined overall threshold of probability and selecting elementary zones, the sum of whose probability values remains below or equal to that threshold.

34. The method according to claim 13, wherein satisfying the predetermined criterion involves fixing a predetermined overall threshold of probability and selecting each elementary zone, whose probability value remains below or equal to said threshold.

35. The method according to claim 25, wherein satisfying the predetermined criterion involves fixing a predetermined overall threshold of probability and selecting each elementary zone, whose probability value remains below or equal to said threshold.

36. The method according to claim 1, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

37. The method according to claim 2, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

38. The method according to claim 3, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

39. The method according to claim 5, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

40. The method according to claim 10, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

41. The method according to claim 11, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

42. The method according to claim 12, wherein the theoretical number of elements detected is expressed in terms of false negative and false positive probability, and in that satisfying the predetermined criterion involves fixing a pre-determined overall threshold of probability and selecting each elementary zone, of which a given linear combination of two false negative and false positive probability values remains below or equal to that threshold.

* * * * *